United States Patent
Carter et al.

(10) Patent No.: US 11,280,511 B2
(45) Date of Patent: Mar. 22, 2022

(54) SYSTEMS AND METHODS FOR EVAPORATIVE HEAT REJECTION EQUIPMENT FAN SPEED CONTROL

(71) Applicant: Johnson Controls Technology Company, Auburn Hills, MI (US)

(72) Inventors: Thomas P. Carter, Olney, MD (US); Zan Liu, Waynesboro, PA (US)

(73) Assignee: Johnson Controls Technology Company, Auburn Hills, MI (US)

(*) Notice: Subject to any disclaimer, the term of this patent is extended or adjusted under 35 U.S.C. 154(b) by 212 days.

(21) Appl. No.: 16/328,489

(22) PCT Filed: Aug. 29, 2017

(86) PCT No.: PCT/US2017/049136
§ 371 (c)(1),
(2) Date: Feb. 26, 2019

(87) PCT Pub. No.: WO2018/044902
PCT Pub. Date: Mar. 8, 2018

(65) Prior Publication Data
US 2019/0195524 A1    Jun. 27, 2019

Related U.S. Application Data

(60) Provisional application No. 62/426,205, filed on Nov. 23, 2016, provisional application No. 62/383,375, filed on Sep. 2, 2016.

(51) Int. Cl.
*F24F 11/47* (2018.01)
*F24F 3/044* (2006.01)
(Continued)

(52) U.S. Cl.
CPC .............. *F24F 11/47* (2018.01); *F24F 3/044* (2013.01); *F24F 11/0008* (2013.01);
(Continued)

(58) Field of Classification Search
CPC .. F24F 11/47; F24F 11/65; F24F 11/74; F24F 11/86; F24F 11/0008; F24F 3/044;
(Continued)

(56) References Cited

U.S. PATENT DOCUMENTS 4,325,223 A * 4/1982 Cantley .............. G05D 23/1917
62/126
5,040,377 A    8/1991 Braun et al.
(Continued)

FOREIGN PATENT DOCUMENTS

CN    102341656    2/2012
CN    102348945    2/2012
(Continued)

OTHER PUBLICATIONS

Dong, "Calculation and Test Research on Water Consumption of Evaporative Cooling Air Conditioning Unit", Master Degree Thesis of Xi'an Polytechnic University, Mar. 19, 2016, 77 pages, full text with English language abstract.
(Continued)

*Primary Examiner* — Marc E Norman
(74) *Attorney, Agent, or Firm* — Fletcher Yoder, P.C.

(57) ABSTRACT

A thermal management system includes a heat rejection device configured to fluidly couple to a refrigeration system, a fan configured to provide an entering airflow across the heat rejection device to cool a flow of water within the heat rejection device, and a controller configured to control a speed of the fan based on at least two of (i) a relative humidity of the entering airflow, (ii) a percentage of capacity one or more components of the refrigeration system are operating at, (iii) a ratio of water to energy costs, and (iv) a ratio of a design power of a compressor of the refrigeration system to a design power of the fan to minimize a total utility operation cost of the thermal management system including
(Continued)

(i) energy costs to operate the fan and the refrigeration system and (ii) water costs of the flow of water.

19 Claims, 7 Drawing Sheets

(51) Int. Cl.
  *F25B 49/02* (2006.01)
  *F24F 11/74* (2018.01)
  *F24F 11/86* (2018.01)
  *F24F 11/65* (2018.01)
  *F24F 11/00* (2018.01)
  *F24F 13/06* (2006.01)
  *F24F 110/20* (2018.01)
  *F25B 25/00* (2006.01)
  *F24F 140/60* (2018.01)
  *F24F 140/50* (2018.01)

(52) U.S. Cl.
  CPC .............. *F24F 11/65* (2018.01); *F24F 11/74* (2018.01); *F24F 11/86* (2018.01); *F24F 13/06* (2013.01); *F25B 49/027* (2013.01); *F24F 2110/20* (2018.01); *F24F 2140/50* (2018.01); *F24F 2140/60* (2018.01); *F25B 25/005* (2013.01); *F25B 2339/047* (2013.01); *F25B 2500/05* (2013.01); *F25B 2500/19* (2013.01); *F25B 2600/11* (2013.01); *F25B 2600/111* (2013.01); *F25B 2700/21162* (2013.01); *F25B 2700/21163* (2013.01); *F25B 2700/21171* (2013.01); *Y02B 30/70* (2013.01)

(58) Field of Classification Search
  CPC .... F24F 13/06; F24F 2110/20; F24F 2140/50; F24F 2140/60; F24F 2110/22; F25B 25/005; F25B 49/027; F25B 2339/047; F25B 2500/05; F25B 2500/19; F25B 2600/11; F25B 2600/111; F25B 2700/21162; F25B 2700/21163; F25B 2700/21171; Y02B 30/70
  See application file for complete search history.

(56) References Cited

U.S. PATENT DOCUMENTS

| | | | |
|---|---|---|---|
| 9,541,317 B2* | 1/2017 | Yokohara | F25B 47/022 |
| 2011/0083454 A1 | 4/2011 | Kopko et al. | |
| 2014/0202151 A1* | 7/2014 | Bharathan | F28B 1/06 |
| | | | 60/641.2 |
| 2016/0047578 A1 | 2/2016 | Warren | |
| 2020/0208887 A1* | 7/2020 | Mohammad | F28F 27/003 |
| 2020/0401165 A1* | 12/2020 | Rollins | F04D 27/004 |

FOREIGN PATENT DOCUMENTS

| | | | | |
|---|---|---|---|---|
| CN | 202216364 | | 5/2012 | |
| CN | 103282734 | | 9/2013 | |
| DE | 4429934 | A1 * | 2/1996 | .......... H01Q 1/2233 |
| JP | H05-215366 | | 8/1993 | |

OTHER PUBLICATIONS

Office Action on CN 201780065297.1, dated Jun. 9, 2020, 24 pages with English language translation.

Qingshan et al., "Data-driven Modeling and Optimal Operation Simulation of a Cooling Tower", Computers and Applied Chemistry, Sep. 28, 2014, 31.9, pp. 1147-1149, with English language abstract.

International Search Report and Written Opinion on International Application No. PCT/US2017/049136 dated Feb. 21, 2018. 21 pages.

* cited by examiner

SYSTEMS AND METHODS FOR EVAPORATIVE HEAT REJECTION EQUIPMENT FAN SPEED CONTROL

CROSS-REFERENCE TO RELATED PATENT APPLICATIONS

This application is a U.S. National Stage Application of PCT/US2017/049136, filed Aug. 29, 2017, which claims the benefit of U.S. Provisional Patent Application No. 62/383,375, filed Sep. 2, 2016, and U.S. Provisional Patent Application No. 62/426,205, filed Nov. 23, 2016, all of which are incorporated herein by reference in their entireties.

BACKGROUND

Operating costs for thermal management systems having evaporative heat rejection equipment typically include energy costs to operate the components of the thermal management system and water costs for water used within the evaporative heat rejection equipment. Traditionally, such thermal management systems are controlled based solely on energy costs, neglecting the water costs, leading to increased operating costs.

SUMMARY

One embodiment relates to a thermal management system. The thermal management system includes a heat rejection device configured to fluidly couple to a refrigeration system, a fan configured to provide an entering airflow across the heat rejection device to cool a flow of water within the heat rejection device, and a controller configured to control a speed of the fan based on at least two of (i) a relative humidity of the entering airflow, (ii) a percentage of capacity one or more components of the refrigeration system are operating at, (iii) a ratio of water to energy costs, and (iv) a ratio of a design power of a compressor of the refrigeration system to a design power of the fan to minimize a total utility operation cost of the thermal management system including (i) energy costs to operate the fan and the refrigeration system and (ii) water costs of the flow of water.

Another embodiment relates to a method for evaporative heat rejection equipment fan speed control. The method includes receiving, by a processing circuit from a humidity sensor, humidity data indicative of a relative humidity of an entering airflow being moved across an evaporative heat rejection device by a fan; receiving, by the processing circuit, capacity data indicative of a percentage of capacity at least one component of a refrigeration system is operating at, where the refrigeration system is fluidly coupled with the heat rejection device; and controlling, by the processing circuit, a speed of the fan based on the relative humidity of the entering airflow and the percentage of capacity the at least one component of the refrigeration system is operating at.

Still another embodiment relates to a thermal management system. The thermal management system includes a refrigeration system, a cooling tower, a fan, and a controller. The refrigeration system has a compressor, an evaporator, a condenser, and an expansion valve. The cooling tower is fluidly coupled to the condenser. The fan is positioned to provide an airflow across the cooling tower to cool a flow of water within the cooling tower. The controller is configured to control a speed of the fan based on a relative humidity of the airflow and a capacity ratio of the condenser.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Traditionally, in order to produce the lowest chiller kilowatts per ton (kW/ton) or lowest compressor horsepower per ton (HP/ton), cooling tower and evaporative condenser fans are run at full speed until the minimum condensing pressure allowed by the compressor system is reached. Such a control scheme may not provide for efficient control of the system and reduces overall system efficiencies. Such a control strategy may not take into account water usage in the evaporative cooling devices, and therefore does not aim to reduce water usage. Additionally, one skilled in the art would expect that slowing the fan speed down would thereby raise the compressor condensing temperature and increase the compressor heat that must be rejected, leading to an increase in load and water usage for the evaporative cooling devices.

Overall system operating costs are a function of both energy and water usage. Traditional control methods focus on only energy use and neglect the cost of water in control decisions. Additionally, these traditional control methods may not provide the lowest system energy costs (e.g., chiller/compressor energy costs and cooling tower/condenser energy costs) under all load and ambient temperature conditions. Current evaporative heat rejection fan control strategies fail to (i) yield the lowest overall system operating costs under all load and ambient temperature conditions experienced by the system (e.g., during the year, etc.) and (ii) effectively yield the lowest evaporative heat rejection device's water consumption under all load and ambient temperature conditions experienced by the system.

According to an exemplary embodiment, the evaporative heat rejection fan control scheme of the present disclosure dynamically (e.g., adaptively, etc.) adjusts the speed of a fan of an evaporative heat rejection device based on various factors to assure that the system may (i) operate at the lowest operating costs and (ii) reduce the water usage of the evaporative heat rejection device under all operating conditions experienced by the system (e.g., throughout the year). According to an exemplary embodiment, the dynamic evaporative cooling fan speed control scheme takes into account (i) the ratio of actual to design load for the condenser and (ii) the ambient air relative humidity. The control scheme may thereby reduce the total system operating costs (e.g., energy costs plus water costs) under all load and ambient temperature conditions. The control scheme may reduce the water usage of the evaporative heat rejection device by adjusting the fan speed to minimize the non-beneficial sensible air cooling load imposed on the device. In some embodiments, the control scheme is further improved by incorporating the ratio of the chiller or compressor energy to the heat rejection equipment fan energy along with the water to energy cost equivalence ratio (WECER ratio=($/1000 gal of water)/($/kWh)).

The evaporation rate on an evaporative heat rejection device may be related to the sum of the process load and the sensible air cooling load of the mass flow rate of air as it passes through the device. If the air dry bulb temperature is increased as it passes through the evaporative heat rejection device, the ratio of the evaporation rate to the process load may be decreased. Conversely, if the air dry bulb temperature is decreased as it passes through the device, the ratio of the evaporation rate to the process load may be increased. According to an exemplary embodiment, a fan speed control scheme is configured to recognize temperature and load conditions which lead to sensible cooling of the air as it passes through the evaporative heat rejection device and then slowing the device's fan speed to elevate the process loop temperatures, thereby increasing the air exit dry bulb temperature to minimize this non beneficial cooling of the air. Not only may the control scheme save amounts of make-up water to the device, but by simultaneously balancing the associated increase in compressor kW with a drop in the evaporative cooling device's fan energy and lower make-up water costs, the control scheme may also reduce the systems total utility (e.g., energy and water) operating costs.

According to an exemplary embodiment, the control scheme is configured to lower the water and total utility costs by setting a maximum cooling tower fan speed based on (e.g., as a function of, etc.) (i) the ratio of the actual condenser range to the design condenser range and (ii) the relative humidity of the ambient air. In some embodiments, the control scheme controls the fan speed based on additional parameters such as (iii) the ratio of water to energy costs and (iv) the ratio of compressor to evaporative heat rejection energy at design conditions to further optimize the heat rejection device's maximum fan speed across a wider range of equipment selections and utility rates.

Figure 1:
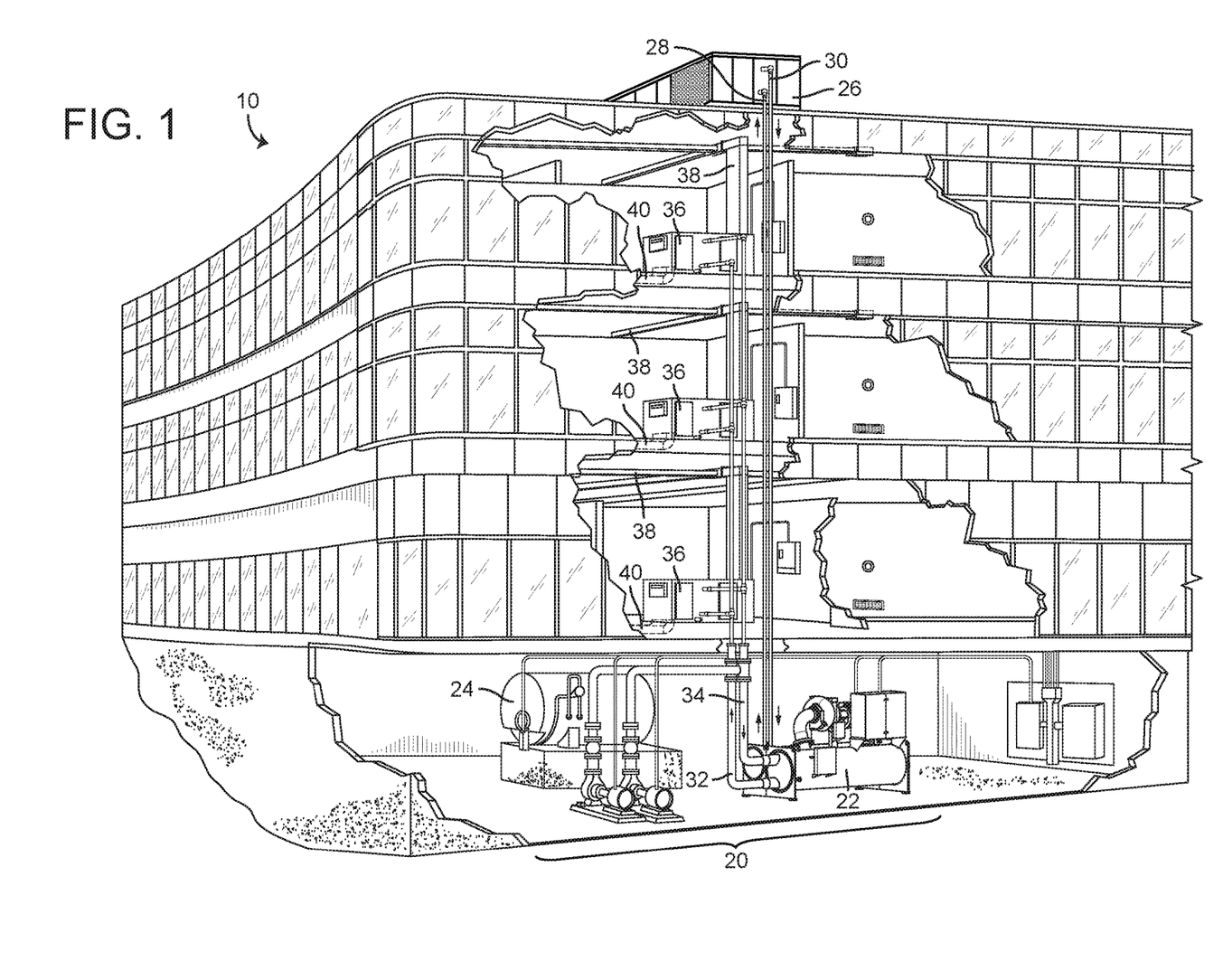
FIG. 1 is a perspective view of a building serviced by a thermal management system, according to an exemplary embodiment.

Referring now to FIG. 1, a perspective view of a building 10 is shown. Building 10 is serviced by a thermal management system 20. Thermal management system 20 may be a refrigeration system, a heating, ventilation, and air conditioning (HVAC) system, and/or another type of thermal management system 20 (e.g., a thermal management system having evaporative heat rejection equipment, etc.). Thermal management system 20 is shown to include a chiller 22, a boiler 24, a cooling unit or cooling tower 26, and a plurality of air-handling units (AHUs) 36. Thermal management system 20 uses a fluid circulation system to provide heating and/or cooling for building 10 and/or a desired space within building 10 (e.g., a refrigerator, a freezer, etc.). The circulated fluid may be cooled in chiller 22 or heated in boiler 24, depending on whether cooling or heating is required. Boiler 24 may add heat to the circulated fluid by burning a combustible material (e.g., natural gas, etc.). Chiller 22 may place the circulated fluid in a heat exchange relationship with another fluid (e.g., a refrigerant, etc.) in a heat exchanger (e.g., an evaporator, etc.). The refrigerant may remove heat from the circulated fluid during an evaporation process, thereby cooling the circulated fluid.

The circulated fluid from chiller 22 or boiler 24 may be transported to AHUs 36 via piping 32. AHUs 36 may place the circulated fluid in a heat exchange relationship with an airflow passing through AHUs 36. For example, the airflow may be passed over piping in fan coil units or other air conditioning terminal units through which the circulated fluid flows. AHUs 36 may transfer heat between the airflow and the circulated fluid to provide heating or cooling for the airflow. The heated or cooled air may be delivered to building 10 and/or the desired space via an air distribution system including air supply ducts 38 and may return to AHUs 36 via air return ducts 40. Thermal management system 20 is shown to include a separate AHU 36 on each floor of building 10. In other embodiments, the AHUs 36 are selectively positioned in the desired areas (e.g., within a freezer, within a refrigerator, etc.). In other embodiments, a single AHU (e.g., a rooftop AHU) may supply air for multiple floors or zones. The circulated fluid from AHUs 36 may return chiller 22 or boiler 24 via piping 34.

In some embodiments, the refrigerant in chiller 22 is vaporized upon absorbing heat from the circulated fluid. The vapor refrigerant may be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant may be discharged into a condenser within chiller 22. In some embodiments, water (or another fluid) flows through tubes in the condenser of chiller 22 to absorb heat from the refrigerant vapor, thereby causing the refrigerant to condense. The water flowing through tubes in the condenser may be pumped from chiller 22 to a cooling tower 26 via piping 28. Cooling tower 26 may use fan driven cooling or fan driven evaporation to remove heat from the water. The cooled water from cooling tower 26 may be delivered back to chiller 22 via piping 30 and the cycle repeats.

Figure 2A:
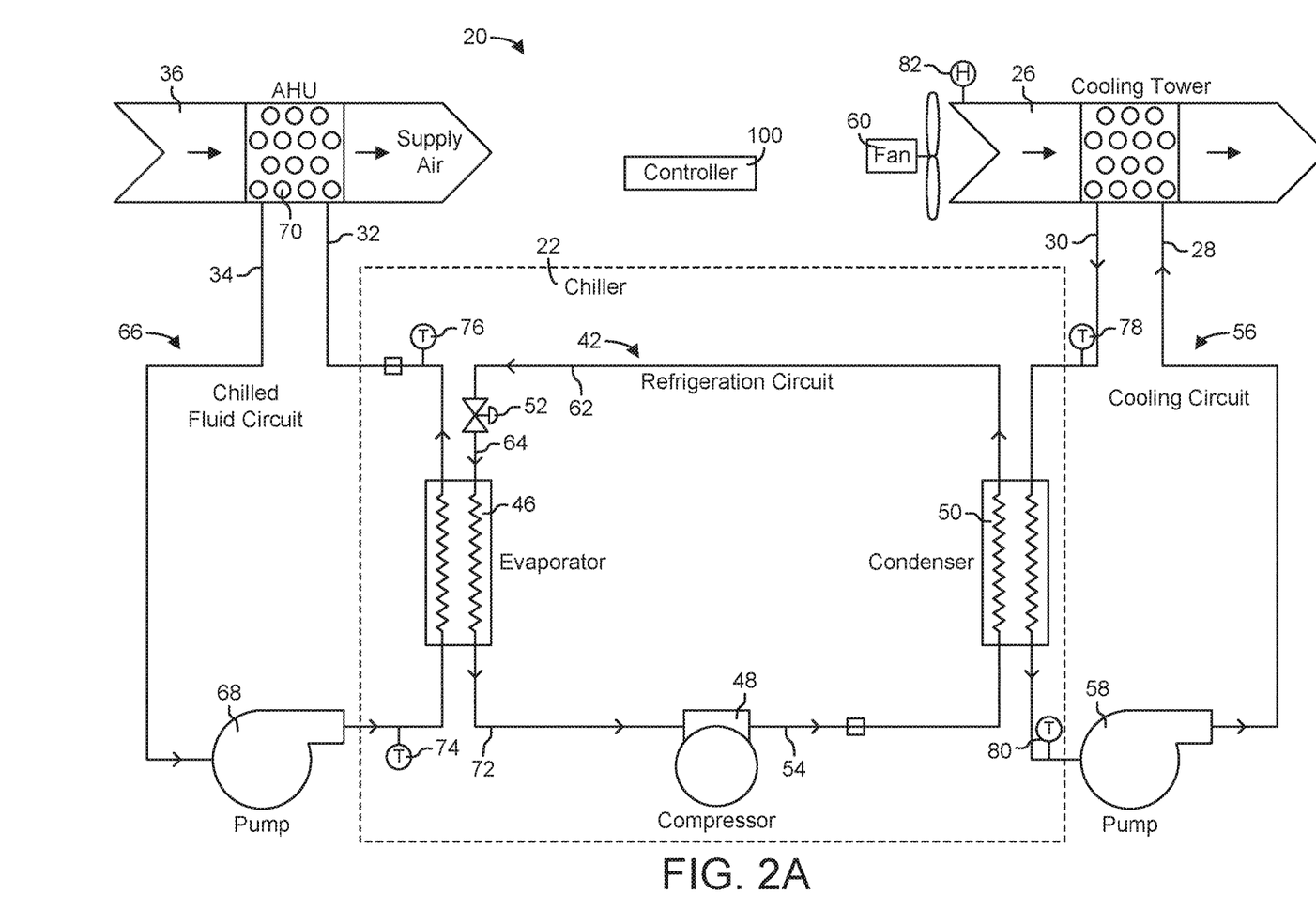
FIG. 2A is a block diagram illustrating a portion of the thermal management system of FIG. 1 in greater detail including a cooling tower, according to an exemplary embodiment.

Referring now to FIG. 2A, a block diagram illustrating a portion of thermal management system 20 in greater detail is shown, according to an exemplary embodiment. In FIG. 2A, chiller 22 is shown to include a refrigeration circuit 42. Refrigeration circuit 42 is shown to include an evaporator 46, a compressor 48, a condenser 50, and an expansion valve 52. Compressor 48 may be configured to circulate a refrigerant through refrigeration circuit 42. In some embodiments, compressor 48 is operated by controller 100. Compressor 48 may compress the refrigerant to a high pressure, high temperature state and discharge the compressed refrigerant into a compressor discharge line 54 connecting the outlet of compressor 48 to the inlet of condenser 50. According to an exemplary embodiment, compressor 48 is a screw compressor. In some embodiments, compressor 48 is a screw compressor, a semi-hermetic screw compressor, a hermitic or open screw compressor, a scroll compressor, a reciprocating compressor, a centrifugal compressor, or still another type of compressor.

Condenser 50 may receive the compressed refrigerant from compressor discharge line 54. Condenser 50 may also receive a separate heat exchange fluid from cooling circuit 56 (e.g., water, a water-glycol mixture, another refrigerant, etc.). Condenser 50 may be configured to transfer heat from the compressed refrigerant to the heat exchange fluid (e.g., water, etc.), thereby causing the compressed refrigerant to condense from a gaseous refrigerant to a liquid or mixed fluid state. In some embodiments, cooling circuit 56 is a heat recovery circuit configured to use the heat absorbed from the refrigerant for heating applications. In other embodiments, cooling circuit 56 includes a pump 58 for circulating the heat exchange fluid between condenser 50 and cooling tower 26. Cooling tower 26 includes fan 60 configured to facilitate heat transfer between the heat exchange fluid and another fluid (e.g., air) flowing through cooling tower 26. According to an exemplary embodiment, controller 100 is configured to control operation of the fan 60 (e.g., the speed thereof, etc.). The heat exchange fluid may reject heat in cooling tower 26 and return to condenser 50 via piping 30.

Still referring to FIG. 2A, refrigeration circuit 42 is shown to include a line 62 connecting an outlet of condenser 50 to an inlet of expansion device 52. Expansion device 52 may be configured to expand the refrigerant in refrigeration circuit 42 to a low temperature and low pressure state. Expansion device 52 may be a fixed position device or variable position device (e.g., a valve). Expansion device 52 may be actuated manually or automatically (e.g., by controller 100 via a valve actuator) to adjust the expansion of the refrigerant passing therethrough. Expansion device 52 may output the expanded refrigerant into line 64 connecting an outlet of expansion device 52 to an inlet of evaporator 46.

Evaporator 46 may receive the expanded refrigerant from line 64. Evaporator 46 may also receive a separate chilled fluid from chilled fluid circuit 66 (e.g., water, a water-glycol mixture, another refrigerant, etc.). Evaporator 46 may be configured to transfer heat from the chilled fluid to the expanded refrigerant in refrigeration circuit 42, thereby cooling the chilled fluid and causing the refrigerant to evaporate. In some embodiments, chilled fluid circuit 66 includes a pump 68 for circulating the chilled fluid between evaporator 46 and AHU 36. AHU 36 may include cooling coils 70 configured to facilitate heat transfer between the chilled fluid and another fluid (e.g., air) flowing through AHU 36. The chilled fluid may absorb heat in AHU 36 and return to evaporator 46 via piping 34. Evaporator 46 may output the heated refrigerant to compressor suction line 72 connecting the outlet of evaporator 46 with the inlet of compressor 48.

In other embodiments, the chilled fluid circuit 66 is replaced with a fan and/or the cooling circuit 56 is replaced with an evaporative condenser (e.g., a parallel flow, a counterflow, a crossflow, etc. evaporative condenser, etc.) having a fan and a fluid spray system (e.g., a water spray system, etc.). By way of example, a fan may be positioned to force an airflow through or across evaporator 46 and/or condenser 50, respectively. The fan may be controlled by controller 100 to modulate the rate of heat transfer in evaporator 46 and/or condenser 50. In some embodiments, the fan is a variable speed fan capable of operating at multiple different speeds. Controller 100 may increase or decrease the speed of the fan in response to various inputs (e.g., temperature measurements, pressure measurements, etc.). By way of another example, the fluid spray system may be positioned to spray a fluid (e.g., water, etc.) across condenser 50. The spray pump may additionally or alternatively be controlled by controller 100 to modulate the rate of heat transfer in condenser 50. The fan, the spray pump, condenser 50, and/or evaporator 46 may thereby provide a thermally regulated airflow (e.g., cooled air, conditioned air, at a temperature acceptable for refrigeration and/or freezing, etc.) directly to a desired space.

Figure 2B:
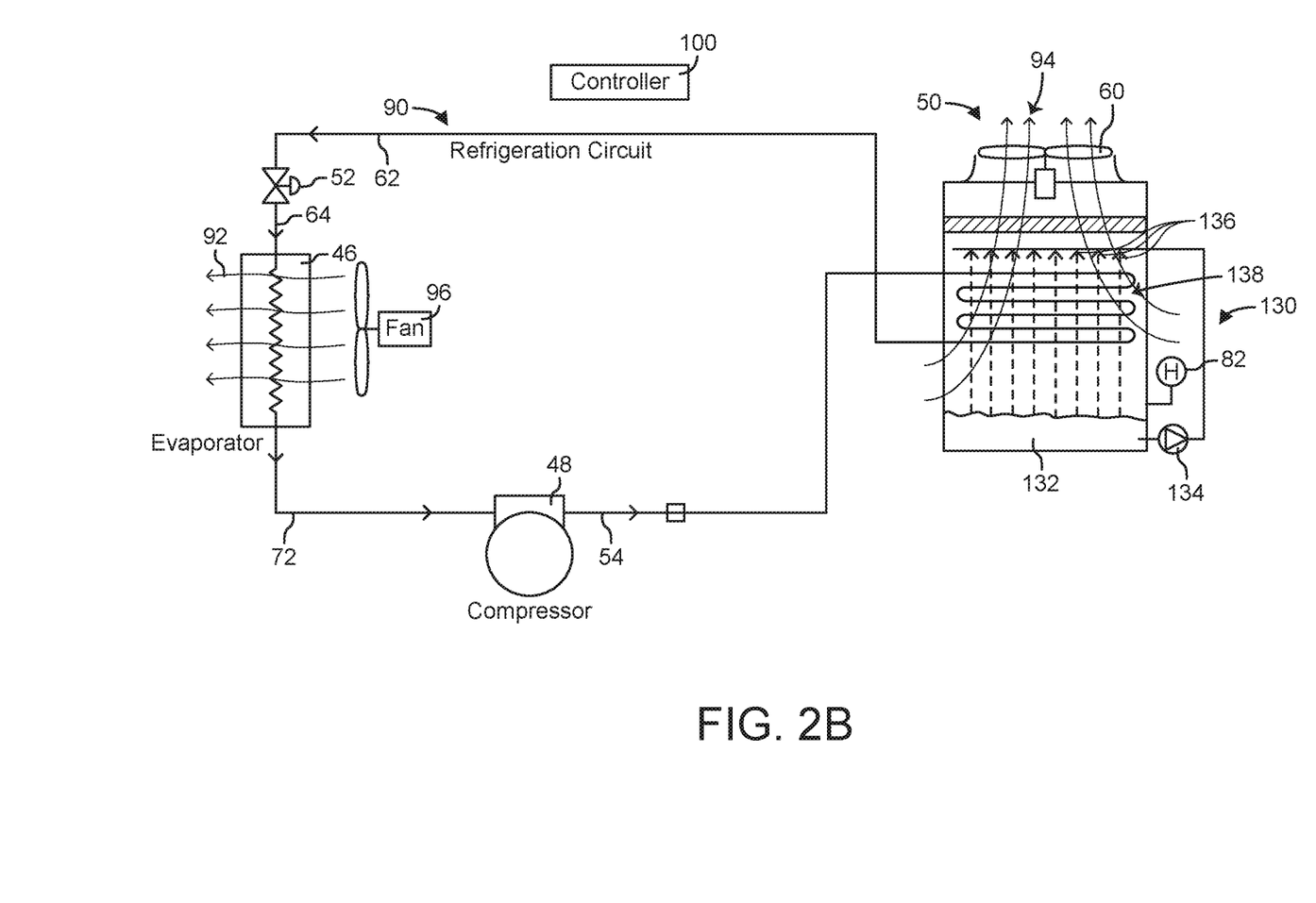
FIG. 2B is a block diagram illustrating a portion of the thermal management system of FIG. 1 in greater detail including an evaporative condenser, according to an exemplary embodiment.

For example, as shown in FIG. 2B, refrigeration circuit 42 may be replaced with refrigeration circuit 90. Refrigeration circuit 90 may be the same or similar to refrigeration circuit 42 as described with reference to FIG. 2A. For example, refrigeration circuit 90 is shown to include evaporator 46, compressor 48, condenser 50, expansion device 52, compressor discharge line 54, line 62, line 64, and compressor suction line 72. Refrigeration circuit 90 may be implemented in a chiller (e.g., chiller 22) or used in a various other refrigeration systems or devices such as refrigerators, freezers, refrigerated display cases, refrigerated storage devices, product coolers, standalone air conditioners, or any other system or device that provides cooling using a vapor-compression refrigeration loop.

In refrigeration circuit 90, evaporator 46 is shown absorbing heat from an airflow 92 forced through or across evaporator 46 by a fan 96 (e.g., replacing chilled fluid circuit 66, etc.). In other embodiments, refrigeration circuit 90 does not include fan 96, but rather includes chilled fluid circuit 66 of FIG. 2A.

As shown in FIG. 2B, condenser 50 is configured as an evaporative condenser having fan 60 and a fluid spray system 130. Fluid spray system 130 includes a fluid source 132, a spray pump 134, and one or more outlet or spray nozzles 136. Fluid source 132 may be configured to provide and/or store a fluid (e.g., water, from a utility, from a collection basin below the condenser, etc.). Spray pump 134 may be configured to pump the fluid from fluid source 132 to spray nozzles 136. Spray nozzles 136 may be positioned and/or configured to provide a fluid spray 138 to and/or across condenser 50. Similarly, fan 60 may be positioned to move an airflow 94 through or across condenser 50 (e.g., replacing cooling circuit 56, etc.). Condenser 50 may thereby reject heat to airflow 94. Fluid spray 138 may further increase the heat rejected by condenser 50 to airflow 94. Fan 96 and/or fan 60 may be controlled by controller 100 to modulate the rate of heat transfer in evaporator 46 and/or condenser 50, respectively. In some embodiments, fan 96 and/or fan 60 are variable speed fans capable of operating at multiple different speeds. Controller 100 may increase or decrease the speed of fan 96 and/or fan 60 in response to various inputs from refrigeration circuit 90 (e.g., temperature measurements, pressure measurements, energy costs, water costs, etc.).

As shown in FIG. 2A, chilled fluid circuit 66 includes an inlet temperature sensor 74 positioned upstream of evaporator 46. Inlet temperature sensor 74 may be configured to measure a temperature of the fluid (e.g., chilled fluid, etc.) flowing between pump 68 and evaporator 46 (i.e., the temperature of the chilled fluid entering evaporator 46). As shown in FIG. 2A, chilled fluid circuit 66 includes an outlet temperature sensor 76 positioned downstream of the evaporator 46. Outlet temperature sensor 76 may be configured to measure a temperature of the fluid (e.g., chilled fluid, etc.) exiting the evaporator 46. As shown in FIG. 2A, cooling circuit 56 includes an inlet temperature sensor 78 positioned along piping 30. Inlet temperature sensor 78 may be configured to measure a temperature of the fluid (e.g., water, cooling fluid, etc.) flowing within piping 30 between cooling tower 26 and condenser 50 (i.e., the temperature of the water entering condenser 50). As shown in FIG. 2A, cooling circuit 56 includes an outlet temperature sensor 80. Outlet temperature sensor 80 may be configured to measure a temperature of the fluid (e.g., water, cooling fluid, etc.)

exiting the condenser 50. As shown in FIG. 2A, thermal management system 20 includes a humidity sensor 82. Humidity sensor 82 may be positioned and/or configured to measure a relative humidity of the air of the ambient environment entering the cooling tower 26 (e.g., the air the fan 60 is moving across the cooling tower 26, etc.). As shown in FIG. 2B, humidity sensor 82 is positioned and/or configured to measure a relative humidity of the air of the ambient environment entering the condenser 50.

Controller 100 may be configured to control operation of fan 60 at least partially based on the measurement inputs received from the humidity sensor 82. Controller 100 may additionally receive measurement inputs from at least one of inlet temperature sensor 74, outlet temperature sensor 76, inlet temperature sensor 78, and/or outlet temperature sensor 80. Controller 100 may be configured to control operation of compressor 48 and/or fan 60 at least partially based on the measurement inputs received from at least one of humidity sensor 82, inlet temperature sensor 74, outlet temperature sensor 76, inlet temperature sensor 78, and outlet temperature sensor 80. Controller may be an embedded controller for fan 60 configured to control operation of fan 60. Controller 100 may be an embedded controller for chiller 22 configured to control the components of refrigeration circuit 42. For example, controller 100 may be configured to activate/deactivate compressor 48 and open/close expansion device 52. Controller 100 may be configured to determine thermodynamic properties of the refrigerant at various locations within refrigeration circuit 42. For example, controller 100 may calculate non-measured thermodynamic properties (e.g., enthalpy, entropy, etc.) of the refrigerant in compressor suction line 72, compressor discharge line 54, and/or other locations within refrigeration circuit 42.

Figure 5:
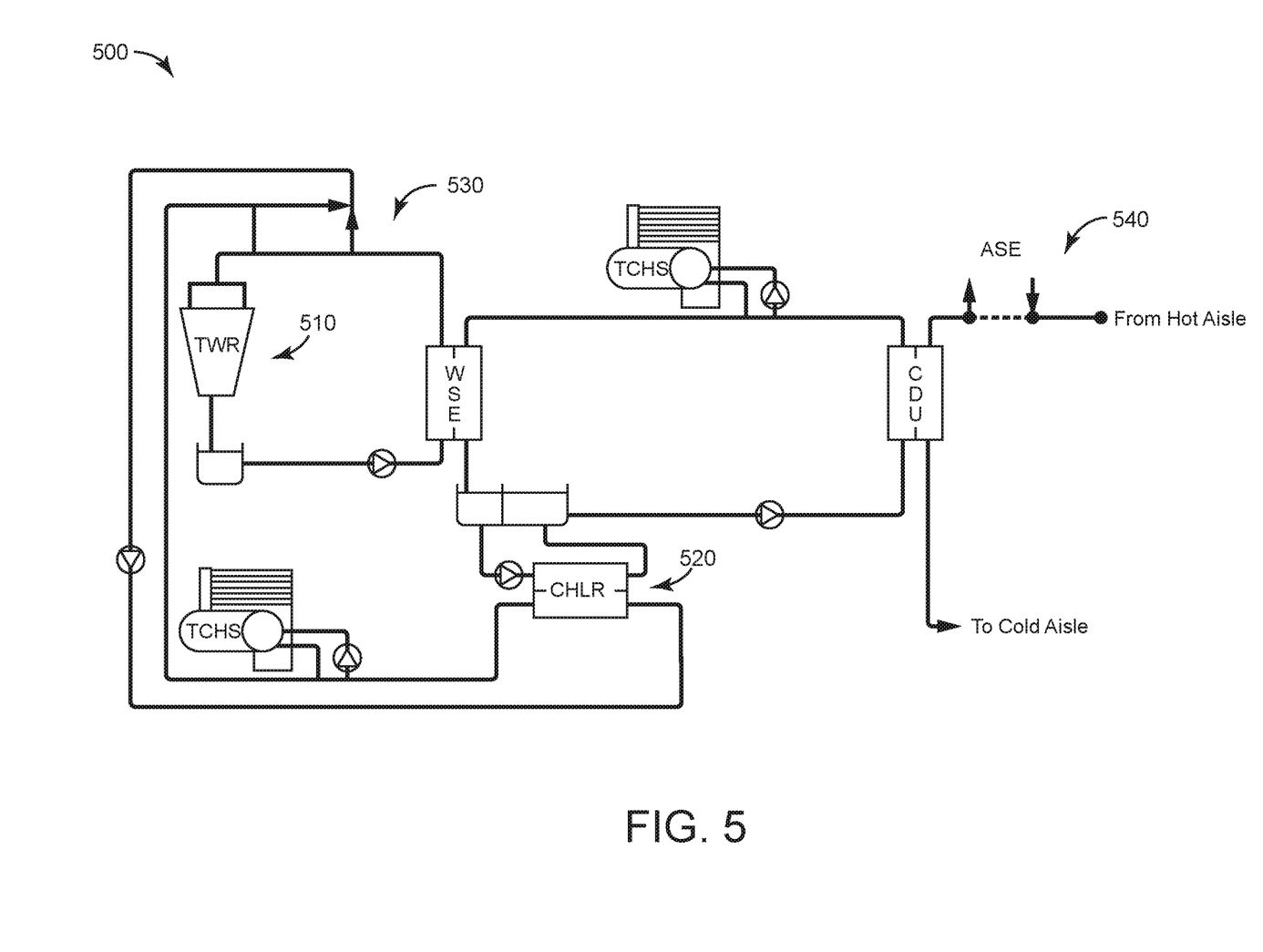
FIG. 5 is a block diagram illustrating a thermal management system, according to another exemplary embodiment.

FIG. 5 shows a thermal management system 500, according to an exemplary embodiment. Thermal management system 500 may be similar to thermal management system 20. As shown in FIG. 5, thermal management system 500 includes a cooling tower 510 as part of a cooling circuit 530 that is fluidly coupled to a chiller 520. Thermal management system 500 also includes a delivery circuit 540 fluidly coupled to the chiller 520 and configured to thermally regulate a conditioned space (e.g., a room, a freezer, a refrigerator, etc.).

Figure 3:
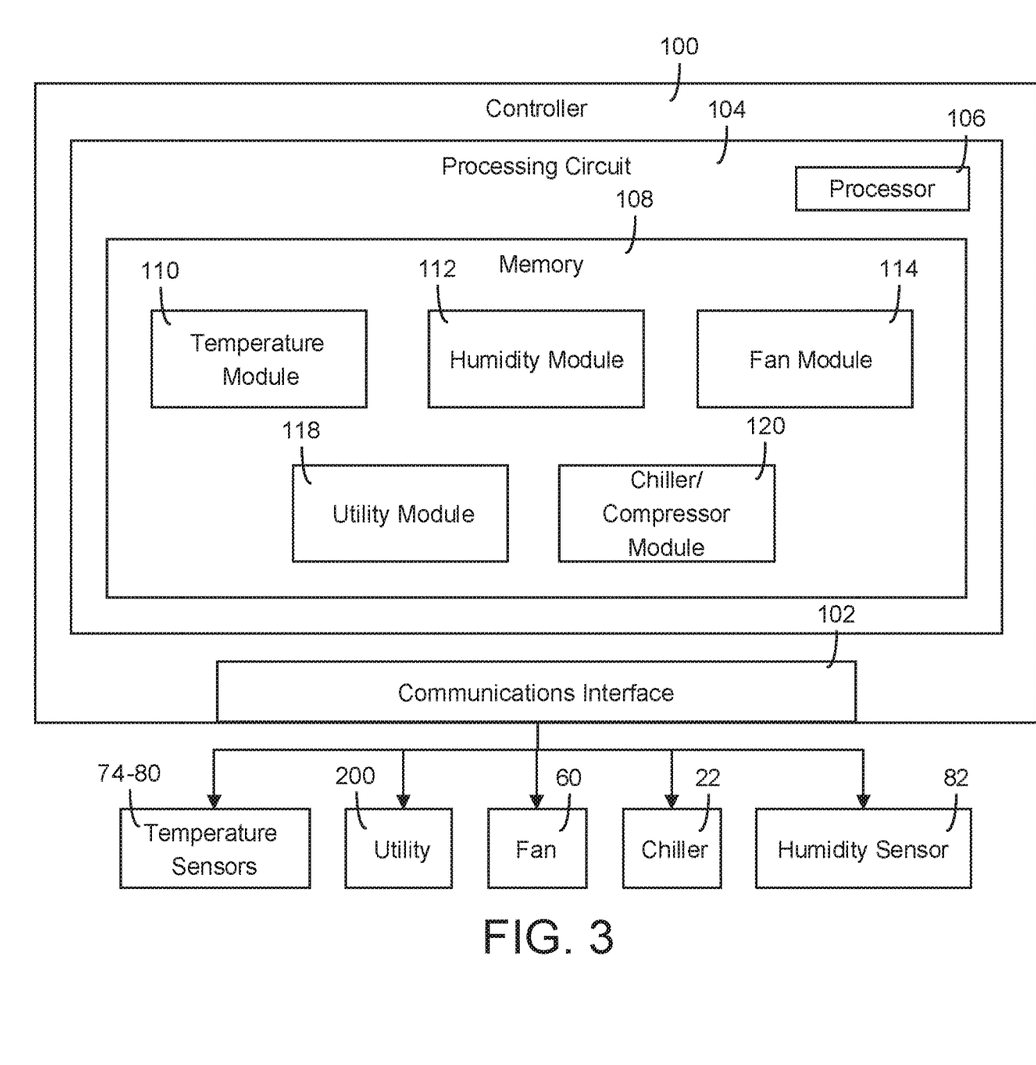
FIG. 3 is a block diagram illustrating a control system for the thermal management system of FIGS. 2A and 2B, according to an exemplary embodiment.

Referring now to FIG. 3, a block diagram of a control system including the controller 100 is shown, according to an exemplary embodiment. According to an exemplary embodiment, controller 100 is configured to selectively control the speed of fan 60 based on at least one of (i) the relative humidity of the air, (ii) the percentage of capacity of one or more components of thermal management system 20 being used (e.g., the ratio of the actual condenser range to the design condenser range, the ratio of the actual evaporator range to the design evaporator range, the ratio of actual compressor power to design compressor power, etc.), (iii) the ratio of water to energy costs, and (iv) the ratio of compressor to evaporative heat rejection energy.

As shown in FIG. 3, controller 100 includes a communications interface 102 and a processing circuit 104. Communications interface 102 may include wired or wireless interfaces (e.g., jacks, antennas, transmitters, receivers, transceivers, wire terminals, etc.) for conducting data communications with various systems, devices, or networks. For example, communications interface 102 may include an Ethernet card and/or port for sending and receiving data via an Ethernet-based communications network. In some embodiments, communications interface 102 includes a wireless transceiver (e.g., a WiFi transceiver, a Bluetooth transceiver, a NFC transceiver, ZigBee, etc.) for communicating via a wireless communications network. Communications interface 102 may be configured to communicate via local area networks (e.g., a building LAN, etc.) and/or wide area networks (e.g., the Internet, a cellular network, a radio communication network, etc.) and may use a variety of communications protocols (e.g., BACnet, TCP/IP, point-to-point, etc.).

In some embodiments, communications interface 102 is configured to facilitate receiving measurement inputs from various sensors. The sensors may include, for example, humidity sensor 82, inlet temperature sensor 74, outlet temperature sensor 76, inlet temperature sensor 78, and/or outlet temperature sensor 80. Communications interface 102 may receive the measurement inputs directly from the sensors, via a local network, and/or via a remote communications network. Communications interface 102 may enable communications between controller 100 and fan 60 (and/or fan 96). In some embodiments, communications interface 102 is configured to facilitate transmitting speed commands to fan 60 (and/or fan 96). Communications interface 102 may send the speed commands directly, via a local network, and/or via a remote communications network. Communications interface 102 may additionally or alternatively enable communications between controller 100 and chiller 22 (e.g., compressor 48, expansion valve 52, etc.). In some embodiments, communications interface 102 is configured to facilitate transmitting load and unload commands to compressor 48 of chiller 22. Communications interface 102 may send the load and unload commands directly, via a local network, and/or via a remote communications network. Communications interface 102 may additionally or alternatively enable communications between controller 100 and a utility 200 (e.g., an energy company, a water company, etc.). Communications interface 102 may receive information (e.g., current energy costs, current water costs, etc.) from utility 200 directly, via a local network, and/or via a remote communications network.

As shown in FIG. 3, processing circuit 104 includes a processor 106 and memory 108. Processor 106 may be a general purpose or specific purpose processor, an application specific integrated circuit (ASIC), one or more field programmable gate arrays (FPGAs), a group of processing components, or other suitable processing components. Processor 106 may be configured to execute computer code or instructions stored in memory 108 (e.g., fuzzy logic, etc.) or received from other computer readable media (e.g., CDROM, network storage, a remote server, etc.) to perform one or more of the processes described herein.

Memory 108 may include one or more data storage devices (e.g., memory units, memory devices, computer-readable storage media, etc.) configured to store data, computer code, executable instructions, or other forms of computer-readable information. Memory 108 may include random access memory (RAM), read-only memory (ROM), hard drive storage, temporary storage, non-volatile memory, flash memory, optical memory, or any other suitable memory for storing software objects and/or computer instructions. Memory 108 may include database components, object code components, script components, or any other type of information structure for supporting the various activities and information structures described in the present disclosure. Memory 108 may be communicably connected to processor 106 via processing circuit 104 and may include computer code for executing (e.g., by processor 106) one or more of the processes described herein.

Memory 108 may include various modules for completing processes described herein. More particularly, as shown in FIG. 3, memory 108 includes a temperature module 110, a humidity module 112, a fan module 114, a utility module 118, and a chiller/compressor module 120. It should be understood that controller 100 and memory 108 may include any number of modules for completing the functions described herein. For example, the activities of multiple modules may be combined as a single module and additional modules with additional functionality may be included. Further, it should be understood that the controller 100 may further control other processes beyond the scope of the present disclosure.

The temperature module 110 may be configured to receive and/or interpret temperature data indicative of the temperature of the cooling fluid (e.g., water, etc.) flowing into and/or out of condenser 50 and/or cooling tower 26 from temperature sensors 78 and 80. The temperature module 110 may be additionally or alternatively configured to receive and/or interpret temperature data indicative of the temperature of the chilled fluid flowing into and/or out of evaporator 46 from temperature sensors 74 and 76. The humidity module 112 may be configured to receive and/or interpret humidity data indicative of the relative humidity of the ambient air entering the cooling tower 26 and/or the condenser 50 (e.g., the evaporative condenser of FIG. 2B, etc.) from the humidity sensor 82. The utility module 118 may be configured to receive and/or interpret utility data indicative of the current cost of energy (e.g., electricity, etc.) and/or water from the utility 200.

The chiller/compressor module 120 may be configured to determine a current or actual load and/or range of one or more components of chiller 22 (e.g., condenser 50, evaporator 46, compressor 48, chiller 22 as a whole, etc.) to determine a percentage of capacity the one or more components of chiller 22 may be currently operating at. In some embodiments, the chiller/compressor module 120 is configured to determine the current load or range of the condenser 50 based on the temperatures of the cooling fluid (e.g., water, etc.) flowing through the condenser 50. By way of example, the actual or current condenser load/range may be determined based on the temperatures of the cooling fluid measured by the inlet temperature sensor 78 and/or the outlet temperature sensor 80, respectively. In other embodiments, the chiller/compressor module 120 is configured to determine the current load or range of the condenser 50 based on additional or alternative factors and/or measurements. The chiller/compressor module 120 may be further configured to receive and store a design load and/or range for the condenser 50. The chiller/compressor module 120 may compare the actual load/range to the design load/range to determine a ratio of the actual load/range to the design load/range (e.g., a percentage of the design load/range, a percentage of capacity, etc.) for condenser 50.

In other embodiments, chiller/compressor module 120 is additionally or alternatively configured to determine the current load or range of evaporator 46 (e.g., based on the temperatures of the chilled fluid flowing through evaporator 46, etc.). By way of example, the actual or current evaporator load/range may be determined based on the temperatures of the chilled fluid measured by inlet temperature sensor 74 and outlet temperature sensor 76 positioned at an inlet and outlet of evaporator 46, respectively. Chiller/compressor module 120 may be further configured to receive and store a design load and/or range for evaporator 46. Chiller/compressor module 120 may compare the actual load/range to the design load/range to determine a ratio of the actual load/range to the design load/range (e.g., a percentage of the design load/range, a percentage of capacity, etc.) for evaporator 46.

In other embodiments, chiller/compressor module 120 is additionally or alternatively configured to determine the current load or range of chiller 22 as a whole. Chiller/compressor module 120 may be further configured to receive and store a design load and/or range for chiller 22. Chiller/compressor module 120 may compare the actual load/range to the design load/range to determine a ratio of the actual load/range to the design load/range (e.g., a percentage of the design load/range, a percentage of capacity, etc.) for chiller 22.

Figure 4:
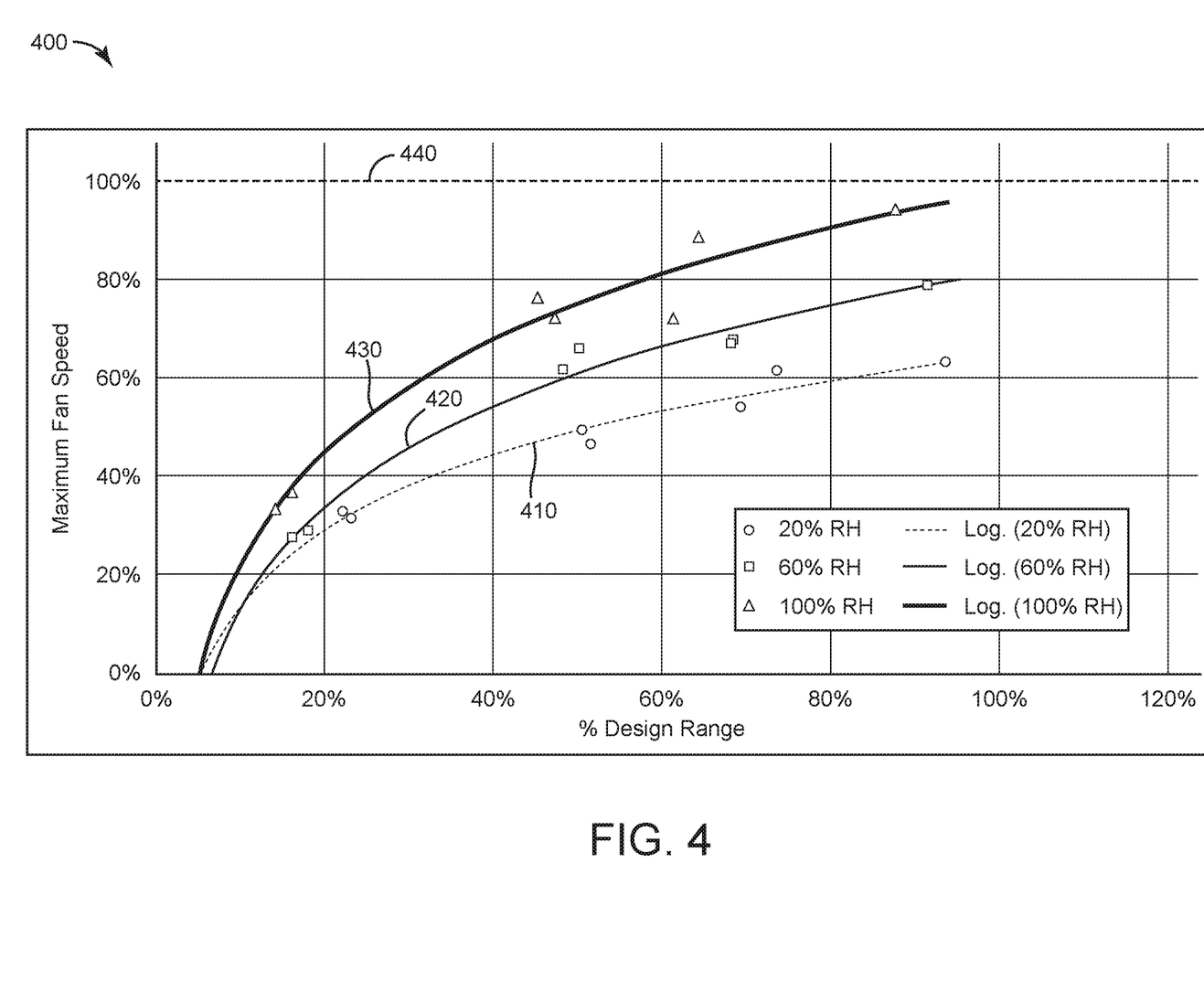
FIG. 4 is a graph illustrating speed for a fan of an evaporative heat rejection equipment based on humidity, according to an exemplary embodiment.

The fan module 114 may be configured to control operation of the fan 60 (e.g., the speed thereof, etc.) based on (i) the percentage of capacity of one or more components of chiller 22 (e.g., the ratio of the actual load/range to the design load/range of the evaporator 46, the condenser 50, the chiller 22, etc.) and/or (ii) the relative humidity of the air. By way of example, the more humid the air, the faster the fan 60 may be operated. By way of another example, the less humid the air, the slower the fan 60 may be operated. Referring now to FIG. 4, a graph 400 of the speed of the fan 60 relative to the percentage of the design load/range (i.e., the ratio of the actual load/range to the design load/range) of the condenser 50 based on the relative humidity is shown according to an exemplary embodiment. As shown in FIG. 4, a traditional control scheme for the fan 60, as indicated by curve 440, includes setting the speed of the fan 60 at a maximum speed (100%) until the desired conditions are met. However, this may lead to very inefficient operation of the thermal management system 20.

Variably controlling the speed of the fan 60 may greatly reduce the energy required for operation due to the energy consumed by the fan 60 being proportional to the cube of the speed. As shown in FIG. 4, the controller 100 is configured to vary the speed of the fan 60 based on the relative humidity and the percentage of the design load/range of the condenser 50, as indicated by curves 410, 420, and 430. Curve 410 depicts the speed of the fan 60 at a relative humidity of 20%° at various percentages of the design range of the condenser 50. Curve 420 depicts the speed of the fan 60 at a relative humidity of 60% at various percentages of the design range of the condenser 50. Curve 430 depicts the speed of the fan 60 at a relative humidity of 100% at various percentages of the design range of the condenser 50. As indicated by curves 410, 420, and 430, the controller 100 is configured to increase the speed of the fan 60 as the relative humidity increases for each respective percentage of the design range of the condenser 50. By way of example, when the condenser 50 is operating at 80% of the design range thereof, the controller 100 may be configured to operate the fan 60 at 60% of the maximum speed when the relative humidity is at 20%, 75% of the maximum speed when the relative humidity is at 60%, and 92% of the maximum speed when the relative humidity is 100%. Therefore, in even extreme conditions, the speed of the fan 60 may be operated below 100% while still providing the required cooling to the cooling tower 26 and/or the condenser 50 (e.g., the evaporative condenser of FIG. 2B, etc.), thereby reducing the operating cost of the thermal management system 20.

The fan module 114 may be additionally or alternatively configured to control operation of the fan 60 (e.g., the speed thereof, etc.) based on the ratio of water to energy costs. By way of example, the fan module 114 may be configured to analyze the costs of water and energy provided by the utility 200 when controlling the speed of the fan 60. For example, if the cost of water increases, the fan module 114 may be configured to speed up the fan 60 and/or reduce the amount of water supplied (e.g., to cooling tower 26 via pump 58, to condenser 50 via spray pump 134, etc.) to save more water (e.g., reduce the amount of water needed for operation, etc.). In another example, if the water cost decreases, the fan module 114 may be configured to control the speed of the fan 60 (e.g., reduce fan speed and increase water supply, etc.) to optimize energy consumption. Therefore, the controller 100 may be configured to control operation of the fan 60 and the thermal management system 20 as a whole, not to optimize energy efficiency alone to reduce energy costs, but to optimize the total operating cost of the thermal management system 20 which includes both (i) the cost of electricity (e.g., usage and efficiency of the components of the thermal management system 20, etc.) and (ii) the cost of water (e.g., the amount of water used, etc.), while operating the fan 60 at a speed that is capable of cooling the water within the cooling tower 26 to a required temperature (or while operating the fan 60 and/or the spray pump 134 at a speed that is capable of cooling the refrigerant) to cool the refrigerant flowing through condenser 50 to meet the load conditions on the thermal management system 20.

The fan module 114 may be additionally or alternatively configured to control operation of the fan 60 (e.g., the speed thereof, etc.) based on the ratio of compressor energy and/or power (e.g., the design energy and/or power of compressor 48, etc.) to evaporative heat rejection energy and/or power (e.g., the design energy and/or power of the fan 60, etc.). By way of example, the fan module 114 may be configured to receive information regarding the design energy and/or power of compressor 48 and the design energy and/or power of the fan 60 (e.g., predefined within the controller 100, entered by an operator of the thermal management system 20, etc.), and thereby be configured to determine the ratio between the design energy and/or power of compressor 48 and the design energy and/or power of the fan 60. A lower ratio between the design energy and/or power of compressor 48 and the design energy and/or power of the fan 60 may have a greater impact on the overall energy usage of the thermal management system 20 based on the speed of the fan 60.

Figure 6:
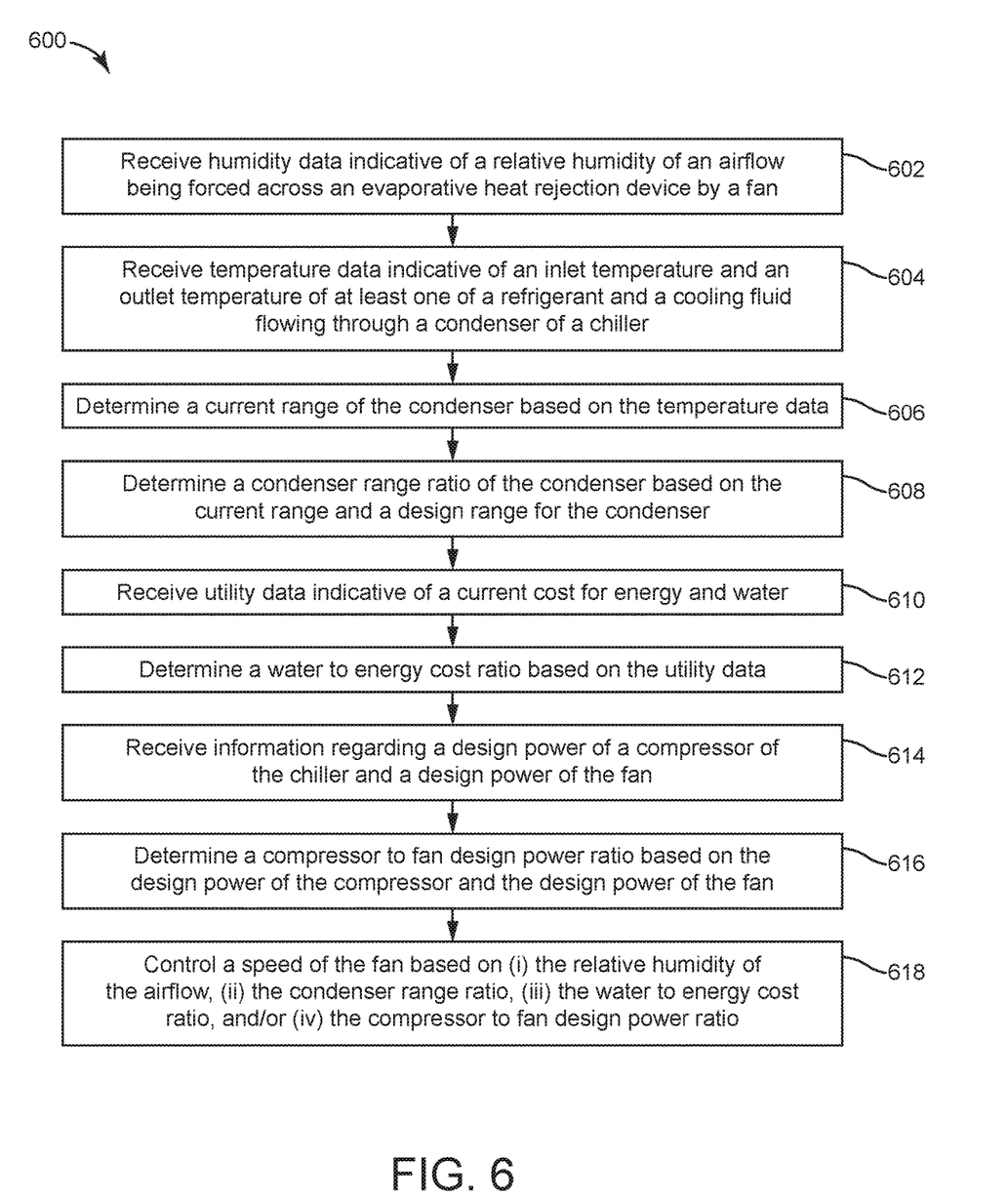
FIG. 6 is a flow diagram of a method for evaporative heat rejection equipment fan speed control, according to an exemplary embodiment.

Referring now to FIG. 6, a method 600 for evaporative heat rejection equipment fan speed control is shown according to an example embodiment. In one example embodiment, method 600 may be implemented with the thermal management system 20 and the controller 100 of FIGS. 1-3 and/or the thermal management system 500 of FIG. 5. As such, method 600 may be described with regard to FIGS. 1-3 and/or 5.

At step 602, a controller (e.g., controller 100, etc.) of a thermal management system (e.g., thermal management system 20, etc.) is configured to receive humidity data (e.g., from humidity sensor 82, etc.) indicative of a relative humidity of an airflow being moved across an evaporative heat rejection device (e.g., cooling tower 26, condenser 50, etc.) by a fan (e.g., fan 60, etc.). At step 604, the controller is configured to receive temperature data (e.g., from inlet temperature sensor 74, outlet temperature sensor 76, inlet temperature sensor 78, outlet temperature sensor 80, etc.) indicative of an inlet temperature and an outlet temperature of a chilled fluid (e.g., within chilled fluid circuit 66, etc.) and a cooling fluid (e.g., water, within cooling circuit 56, etc.) flowing through an evaporator (e.g., evaporator 46, etc.) and/or a condenser (e.g., condenser 50, etc.) of a chiller (e.g., chiller 22, etc.), respectively. At step 606, the controller is configured to determine a current range of the evaporator and/or the condenser based on the temperature data. In other embodiments, the controller is configured to additionally or alternatively determine a current range and/or capacity of a chiller system (e.g., chiller 22, compressor 48, etc.). At step 608, the controller is configured to determine a condenser range ratio (e.g., percent capacity, etc.) of the condenser based on the current range and a design range for the condenser. In some embodiments, the controller is configured to additionally or alternatively determine an evaporator range ratio (e.g., percent capacity, etc.) of the evaporator based on the current range and a design range for the evaporator. In some embodiments, the controller is configured to additionally or alternatively determine a chiller range ratio (e.g., percent capacity, etc.) of the chiller based on the current power and a design power for the chiller.

At step 610, the controller is configured to receive utility data indicative of a current cost for energy (e.g., electricity, etc.) and water. At step 612, the controller is configured to determine a water to energy cost ratio based on the utility data. In some embodiments, step 610 and step 612 are optional. At step 614, the controller is configured to receive information regarding a design power of a compressor (e.g., compressor 48, etc.) of the chiller and a design power of the fan. At step 616, the controller is configured to determine a compressor to fan design power ratio based on the design power of the compressor and the design power of the fan. In some embodiments, step 614 and step 616 are optional. At step 618, the controller is configured to control a speed of the fan based on (i) the relative humidity of the airflow, (ii) the percent capacity of one or more components of the thermal management system (e.g., the condenser range ratio, the evaporator range ratio, the chiller power ratio, etc.), (iii) the water to energy cost ratio, and/or (iv) the compressor to fan design power ratio.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A thermal management system, comprising:
a heat rejector fluidly coupled to a refrigeration system;
a fan configured to move an airflow across the heat rejector to cool a flow of water within the heat rejector; and
a controller configured to:
   determine a fan speed control curve based on a relative humidity of the airflow entering the heat rejector;
   control a speed of the fan in accordance with the fan speed control curve to control a performance of the heat rejector; and
   further control the speed of the fan based on one or more of a percentage of capacity of one or more components of the refrigeration system, a ratio of water to energy costs, or a ratio of a design power of a compressor of the refrigeration system relative to a design power of the fan to manage a total utility operation cost of the thermal management system.

2. The thermal management system of claim 1, wherein the refrigeration system includes the compressor, an evaporator, a condenser, and an expansion valve.

3. The thermal management system of claim 2, wherein the heat rejector is fluidly coupled to the condenser.

4. The thermal management system of claim 3, wherein the heat rejector includes a cooling tower.

5. The thermal management system of claim 2, wherein the heat rejector is the condenser.

6. The thermal management system of claim 5, wherein the condenser includes an evaporative condenser.

7. The thermal management system of claim 2, comprising one or more temperature sensors configured to acquire temperature data indicative of an inlet temperature and an outlet temperature of a fluid flowing through the evaporator, the condenser, or both.

8. The thermal management system of claim 7, wherein the controller is configured to:
receive the temperature data from the one or more temperature sensors;
determine a current capacity of the evaporator, the condenser, or both based on the temperature data; and
determine a respective percentage of capacity of the evaporator, the condenser, or both based on the current capacity and a corresponding design capacity of the evaporator, the condenser, or both.

9. The thermal management system of claim 1, comprising a humidity sensor configured to acquire humidity data indicative of the relative humidity of the airflow entering the heat rejector, wherein the controller is configured to:
receive the humidity data from the humidity sensor; and
determine the relative humidity of the airflow entering the heat rejector based on the humidity data.

10. The thermal management system of claim 1, wherein the controller is configured to:
receive utility data indicative of a current cost for energy and water; and
determine the ratio of water to energy costs based on the utility data.

11. The thermal management system of claim 1, wherein the total utility operation cost includes energy costs associated with operation of the fan and of the refrigeration system and water costs associated with the flow of water.

12. A method, comprising:
receiving, via a processing circuit, feedback from a humidity sensor, wherein the feedback is indicative of a relative humidity of an airflow entering a heat rejector and motivated by a fan;
determining, via the processing circuit, a fan speed control curve based on the relative humidity of the airflow entering the heat rejector;
receiving, via the processing circuit, capacity data indicative of a percentage of capacity of at least one component of a refrigeration system, wherein the refrigeration system is fluidly coupled with the heat rejector; and
controlling, via the processing circuit, a speed of the fan in accordance with the fan speed control curve and based on the percentage of capacity of the at least one component of the refrigeration system to control a performance of the heat rejector.

13. The method of claim 12, wherein the refrigeration system includes a compressor, an evaporator, a condenser, and an expansion valve, wherein the heat rejector is the condenser, and wherein the condenser includes an evaporative condenser having the fan and a fluid spray system.

14. The method of claim 12, wherein the refrigeration system includes a compressor, an evaporator, a condenser, and an expansion valve, wherein the heat rejector includes a cooling tower, and wherein the cooling tower is fluidly coupled to the condenser of the refrigeration system.

15. The method of claim 14, wherein receiving the capacity data includes:
receiving, via the processing circuit, additional feedback from temperature sensors, wherein the additional feedback is indicative of an inlet temperature and an outlet temperature of a cooling fluid flowing through the condenser;
determining, via the processing circuit, a current range of the condenser based on the additional feedback;
determining, via the processing circuit, a condenser range ratio of the condenser based on the current range and a design range for the condenser; and
controlling, via the processing circuit, the speed of the fan based on the condenser range ratio.

16. The method of claim 12, further comprising:
receiving, via the processing circuit, utility data indicative of a current water cost and a current energy cost;
determining, via the processing circuit, a ratio of water to energy costs based on the utility data; and
controlling, via the processing circuit, the speed of the fan based on the ratio of water to energy costs.

17. A thermal management system, comprising:
a refrigeration system having a compressor, an evaporator, a condenser, and an expansion valve fluidly coupled to one another via one or more conduits;
a cooling tower fluidly coupled to the condenser;
a fan configured to move an airflow across the cooling tower to cool a flow of water within the cooling tower; and
a controller configured to:
determine a fan speed control curve based on a relative humidity of the airflow entering the cooling tower; and
control a speed of the fan in accordance with the fan speed control curve and based on and a capacity ratio of the condenser to control a performance of the cooling tower.

18. The thermal management system of claim 17, comprising one or more temperature sensors configured to acquire temperature data indicative of an inlet temperature and an outlet temperature of the water flowing from the cooling tower through the condenser, wherein the controller is configured to:
receive the temperature data from the one or more temperature sensors;
determine a current capacity of the condenser based on the temperature data; and
determine the capacity ratio of the condenser based on the current capacity and a design capacity of the condenser.

19. The thermal management system of claim 17, comprising a humidity sensor configured to acquire humidity data indicative of the relative humidity of the airflow, wherein the controller is configured to:
receive the humidity data from the humidity sensor; and
determine the relative humidity of the airflow entering the cooling tower based on the humidity data.

* * * * *